United States Patent [19]
Ha

[11] Patent Number: 5,441,130
[45] Date of Patent: Aug. 15, 1995

[54] MAGNETIC APPARATUS FOR PREVENTING BACKLASH OF TRANSMISSION FOR A VEHICLE

[76] Inventor: Jung Y. Ha, 1624-1, Bongcheon 7-dong, Kwanak-gu, Seoul 151-057, Rep. of Korea

[21] Appl. No.: 146,012
[22] PCT Filed: May 8, 1992
[86] PCT No.: PCT/KR92/00013
 § 371 Date: Nov. 5, 1993
 § 102(e) Date: Nov. 5, 1993
[87] PCT Pub. No.: WO92/19884
 PCT Pub. Date: Nov. 12, 1992

[30] Foreign Application Priority Data
 May 8, 1991 [KR] Rep. of Korea .................. 91-7418

[51] Int. Cl.⁶ .............................................. F16D 63/00
[52] U.S. Cl. .................. 188/82.84; 192/45.1
[58] Field of Search ............ 188/82, 84, 82.5; 192/45, 45.1, 44

[56] References Cited
U.S. PATENT DOCUMENTS

| | | | |
|---|---|---|---|
| 3,718,212 | 2/1973 | Havranek | 192/45 |
| 3,942,616 | 3/1976 | Elmore | 192/45 |
| 3,994,377 | 11/1976 | Elmore . | |
| 4,106,602 | 8/1978 | Dieckermann | 192/45 |
| 5,156,246 | 10/1992 | Iga | 188/82.84 |
| 5,275,261 | 1/1994 | Vrianish | 188/82.84 |

FOREIGN PATENT DOCUMENTS

| | | |
|---|---|---|
| 298902 | 5/1972 | Austria . |
| 2251629 | 6/1973 | Germany . |
| 2164097 | 9/1976 | Germany . |
| 2604567 | 8/1977 | Germany . |
| 591644 | 9/1977 | Switzerland . |

Primary Examiner—Robert J. Oberleitner
Assistant Examiner—Clifford T. Bartz
Attorney, Agent, or Firm—Michael N. Meller

[57] ABSTRACT

A backlash preventing magnetic apparatus for a transmission for a vehicle having a fixed outer race, and an inner race connected to a driving shaft. A plurality of projections are formed on a circumferential surface of the inner race or outer race. A plurality of rotating bodies are disposed between the outer race and the inner race so that the rotating bodies can be combined with the projections. A permanent magnet is mounted on each of the rotating bodies. An annular plate supporting the rotating body and backlash preventing rollers are disposed between the rotating bodies wherein the backlash preventing roller enables the inner race to rotate in a first direction and prevents rotation in a reverse direction.

4 Claims, 2 Drawing Sheets

MAGNETIC APPARATUS FOR PREVENTING BACKLASH OF TRANSMISSION FOR A VEHICLE

FIELD OF THE INVENTION

The present invention relates to apparatus for preventing backlash of a vehicle transmission, particularly to a magnetic apparatus for preventing backlash of a transmission wherein a stationary driving shaft gear can smoothly mesh with another gear mounted on a passive shaft. Because of low noise, the apparatus can be used for a super-high speed rotating apparatus.

BACKGROUND OF THE INVENTION

At the present time, a backlash-preventing bearing used for a vehicle transmission such as a roller clutch, over running clutch, etc., can be rotated in only one direction, but not in the opposite direction. The bearing prevents backlash appropriately in a gear assembly wherein the driving shaft gear is fixed to mesh with the passive shaft gear.

However, when the gear on a stationary passive shaft meshes with the driving shaft gear, the probability that the driving gear will mesh with the passive gear to rotate is approximately even to the probality that it will mesh with the passive gear not to rotate.

That is, when the stationary passive gear meshes with the driving gear, the teeth of the passive gear and the teeth of the driving gear will not always mesh exactly. Sometimes each gear is met with the free ends of teeth so that the power cannot be transmitted from the driving gear to the passive gear.

The above problem occurs because there is no relative clearance for movement between the driving gear and the passive gear. Whether or not the teeth of the gears mesh depends on the conditions of the mating of the teeth.

Therefore, in the backlash-preventing apparatus of the prior art constructed as above, it is difficult for the gear teeth exactly mesh with each other when the passive gear stops. When the high speed rotation of the driving gear, and the severe friction between the backlash-preventing gears and driving gear generate serious noise, prior art apparatus cannot be used for a super high speed rotating apparatus.

SUMMARY OF THE INVENTION

An object of the present invention is to provide a magnetic apparatus for preventing backlash of a transmission, which positively prevents the backlash of the transmission and which can be adapted to various power transmission apparatus, i.e, motorcycles, automobiles, ships, etc.

Another object of the current invention is to provide a backlash preventing magnetic apparatus for a transmission having a gear assembly mounted on the driving shaft and a passive shaft which can effectively mesh under any conditions, and can be used for super high speed rotating assembly due to little noise.

With the above objects in view, the backlash preventing magnetic apparatus in accordance with the present invention comprises a plurality of projections formed on a circumferential surface of the inner or outer races of a transmission. A plurality of rotating bodies are disposed between said outer race and said inner race so that said rotating bodies can be combined with said projections. A permanent magnet is mounted on said rotating bodies and a backlash-preventing roller is disposed respectively between said rotating bodies.

Thus, when said driving shaft rotates clockwise, said rotating bodies and said backlash-preventing roller disposed between the outer race and the inner race rotates in the same direction by means of said projections. But when said driving shaft rotates counter clockwise by means of a negative load, said backlash-preventing roller is pushed into a narrow space between the outer race and the inner race. Therefore, said backlash-preventing roller functions as a key between the outer race and the inner race. Thus, said inner race cannot rotate backward so that the backlash of the transmission can be finally prevented.

Further scope of appliability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those who are skilled in the art from this detailed description.

THE BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
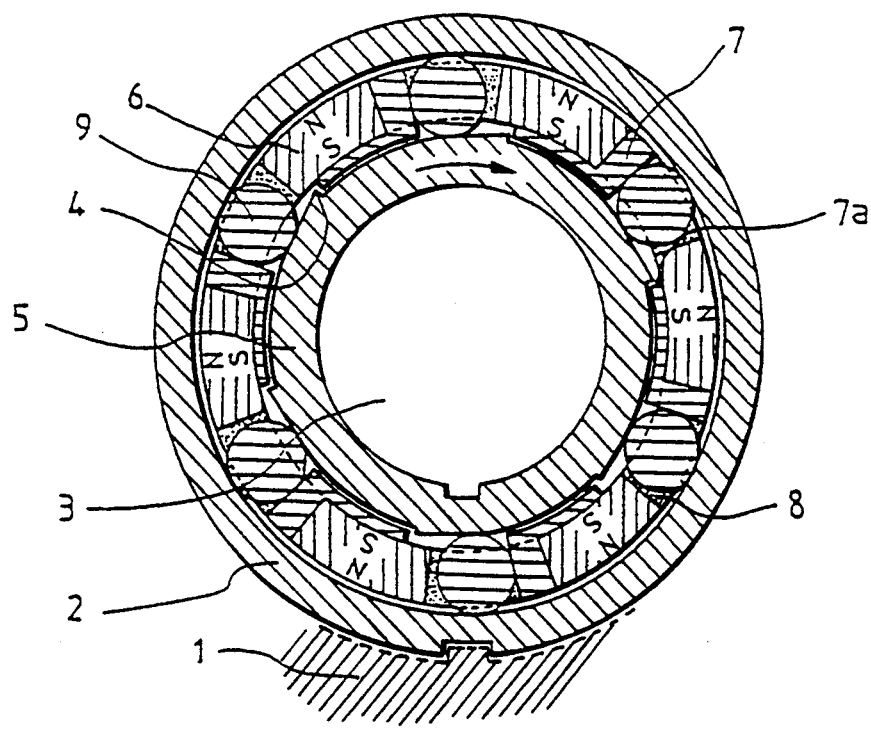
FIG. 1(a) is a cross sectional view of the preferred embodiment of the present invention mounted between an outer race and an inner race of the transmission.

FIG. 1(a) shows a backlash preventing magnetic apparatus in accordance with the preferred embodiment of the present invention. Mounted between the outer race and the inner race, there is shown a body 1 of a transmission on which an outer race 2 is mounted and a driving shaft 3 to which an inner race 5 having a plurality fixed projections 4. In this preferred embodiment, said projections 4 have a triangular cross section and are placed along the circumferential suface of the inner race 5.

A permanent magnet 6 is respectively mounted on a plurality of rotating bodies 7 having an L cross section between the outer race 2 and the inner race 5. The rotating bodies 7 are the same number as said projections 4. An annular plate 8 supporting said rotating body 7 and a backlash preventing roller 9 are disposed between rotating bodies 7.

Thus, if the driving shaft 3 rotates clockwise indicated by the arrow, all components displaced between the driving shaft 3 and the body 1 of the transmission smoothly rotate in the clockwise direction. That is, as the driving shaft 3 rotates in the clockwise direction, the inner race 5 fixed to the driving shaft 3 rotates in the same direction, As the front surface 7a of the rotating body 7 having an L cross section contacts the projection 4 formed on the circumferential surface of the inner race 5, said rotating body 7 rotates with the inner race 5. Also, the annular plate 8 supporting the rotating body 7 and the backlash-preventing roller 9 rotate by means of the rotating body 7. Therefore all components between the driving shaft 3 and the outer race 2 rotate in the same direction as the driving shaft 3 does.

Figure 1B:
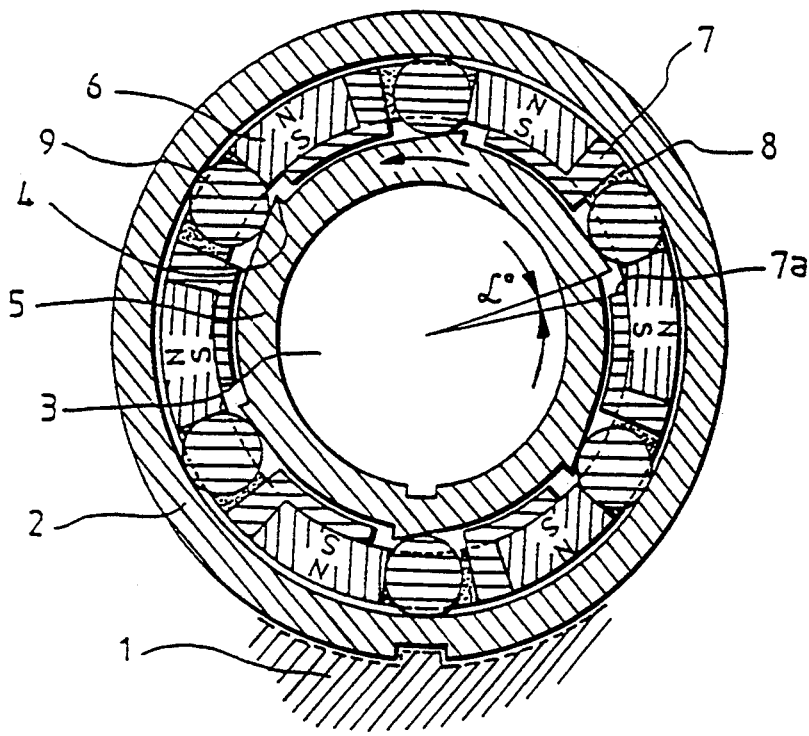
FIG. 1(b) is a cross sectional view of the preferred embodiment of the present invention after a slight reverse rotation of the transmission.

Referring to FIG. 1(b), the direction of rotation of the driving shaft 3 is opposite to that of FIG. 1(a) as indicated by the arrow. FIG. 1(b) shows the stopped state of the driving shaft 3 after a slight backlash of the driving shaft 3. At the stopped state of the driving shaft 3, when a first gear (not shown) mounted on the driving shaft 3 meshes with a second gear (not shown) mounted on a passive shaft, the second gear on the non rotating passive shaft can easily mesh with the first gear on the driving shaft 3. The detailed description of the above state is that the first gear mounted on the driving shaft is released from the second gear on the passive shaft by reason of speed change, and after the operation of the speed change is completed, the first gear again meshes with the second gear. The moment that the free end of the first gear teeth meet with that of the second gear, as shown in FIG. 1(b), the driving shaft 3 turns in the reverse direction about $\alpha$ degree and provides some space to the first gear to allow backward rotation of the first gear.

The backward rotation of the first gear can allow the first gear on the driving shaft 3 to exactly mesh with the second gear on the passive shaft. The backward movement of the first gear comes from the reaction between the gear teeth. Therefore, even in the non-rotating state of the second shaft, the first gear on the driving gear connected to the transmission gear box can easily mesh with the second gear on the passive shaft.

In addition, when the driving shaft 3 is backlashed by the load of the reverse direction, for example when the annular plate 8 is backlashed, i.e. rotates counter-clockwise, by the load of reverse direction, at the stopped state of the annular plate 8 of the rotating body 7 by means of magnetic force of the permanent magnet 6 fixed to the annular plate 8, the inner race 5 is backlashed to about $\alpha$ degree as shown in FIG. 1 (b). At the same time, the backlash preventing roller 9 is pushed to a narrow space between the inner race 5 and the outer race 2. Therefore, said backlash preventing roller 9 functions as a key between the outer race 2 and the inner race 5. Thus said driving shaft 3 cannot rotate backward so that the backlash of the transmission can be positively prevented.

Figure 2A:
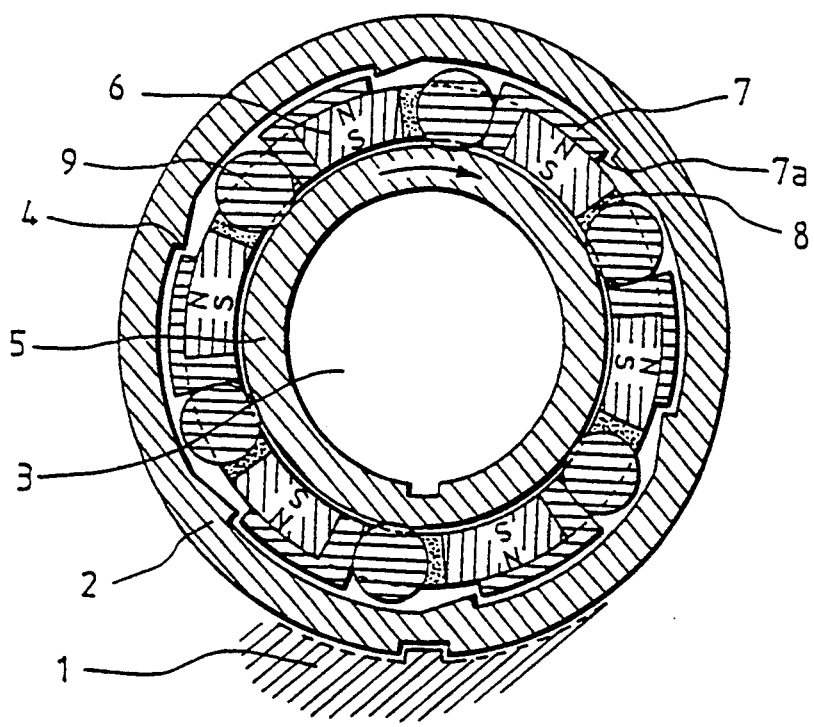
FIG. 2(a) is a view similar to FIG. 1(a) of an alternate embodiment of the present invention.
Figure 2B:
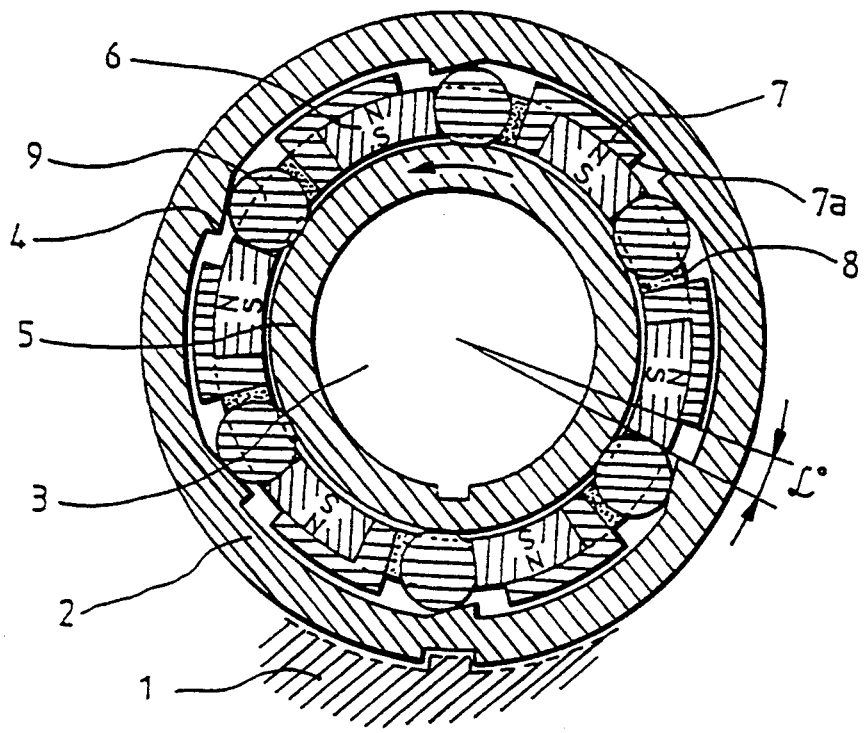
FIG. 2(b) is a view of FIG. 2(a) after slight reverse rotation of the transmission.

FIG. 2(a) and 2(b) show the backlash preventing magnetic apparatus in accordance with the two embodiment. The difference between the another embodiments is that said projections 4 are formed along the circumferential surface of the outer race 2. Therefore, when the driving shaft 3 rotates clockwise, said innner race 5 rotates in the same direction, but the rotating body 7, annular plate 8 and backlash preventing roller 9 placed between the outer race 2 and inner race 5 do not rotate by means of the projection 4, as in the preferred embodiment.

In addition, when said driving shaft 3 rotates counterclockwise as shown in FIG. 2. (b), said backlash preventing roller 9 is pushed to a narrow space between the outer race 2 and the inner race 5. Thus said driving shaft 3 cannot rotate backward so that the backlash of transmission can be positively prevented.

Accordingly, the backlash preventing magnetic apparatus in accordance with the present invention prevents futher backlash after $\alpha$ degree, thereby resulting in no overload on the whole apparatus and effectively preventing reverse rotation in case of a sudden negative load. Further, the backlash preventing magnetic apparatus in accordance with the present invention may be applied to various transmissions, i.e. transmission of autos, bicycles, other vehicles, ships, etc. In addition, in case of free rotation, the driving shaft 3 can rotate at high speed, generating very little friction, so that little noise and heat of friction is generated. Said $\alpha$ degree can be changed under the given conditions, if necessary.

While specific embodiments of the invention have been shown and described in detail to illustrate the application of the principles of the invention, it will be understood that the invention may be embodied otherwise without departing from such principles.

What is claimed is:

1. A backlash preventing apparatus for a transmission of a vehicle, said apparatus having an outer race fixed to a body and having a substantially circular inner surface, an inner race arranged within said outer race and fixed to another body, said inner race having a substantially circular outer surface facing said inner surface of said outer race to form an annular space between said inner and outer races, said backlash preventing apparatus comprising:
    a plurality of projections formed on at least one of said circular surfaces of said races;
    a plurality of rotating bodies disposed in said annular space between said inner and outer races so that said rotating bodies can come into contact with said projections;
    a permanent magnet mounted on each of said rotating bodies; and
    a backlash preventing member disposed in said annular space between said races so that said inner race can rotate in a first direction but not in a direction opposite to said first direction.

2. Apparatus as claimed in claim 1, wherein said inner race is prevented from rotating in said opposite direction when said member rides up on said projections and prevents movement between said races.

3. Apparatus as claimed in claim 1, wherein said projections are formed on said circular surface of said inner race.

4. Apparatus as claimed in claim 1, wherein said projections are formed on said circular surface of said outer race.

* * * * *